W. ANDERSON.
Seed-Drill.
No. 220,267.  Patented Oct. 7, 1879.
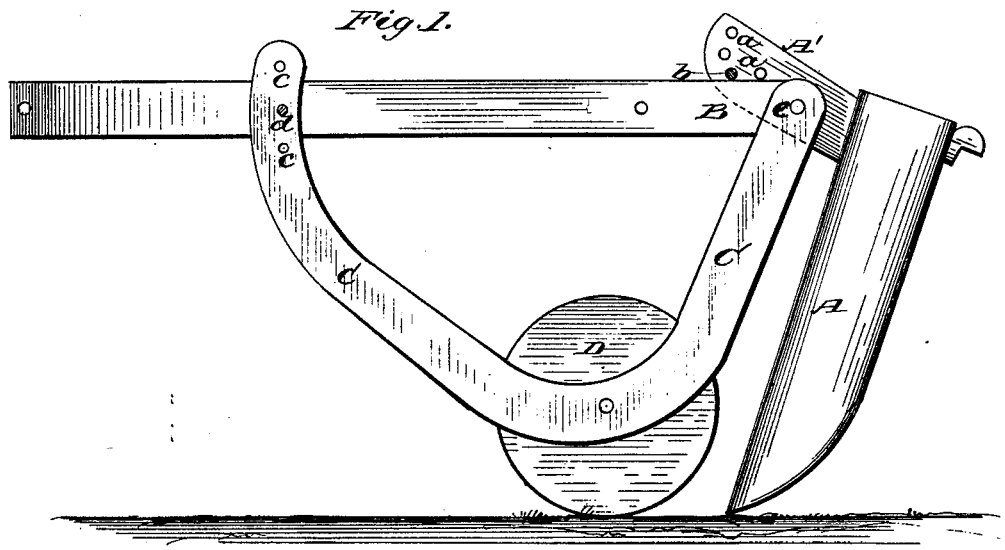
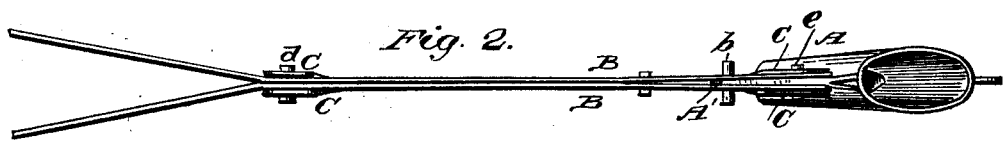
Witnesses
Fred. G. Dieterich
August Peterson
Inventor
Waverly Anderson
by Louis Bagger & Co.
his Attorneys

UNITED STATES PATENT OFFICE.

WAVERLY ANDERSON, OF GUTHRIE, KENTUCKY.

IMPROVEMENT IN SEED-DRILLS.

Specification forming part of Letters Patent No. 220,267, dated October 7, 1879; application filed March 11, 1879.

*To all whom it may concern:*

Be it known that I, WAVERLY ANDERSON, of Guthrie, in the county of Todd and State of Kentucky, have invented certain new and useful Improvements in Seed-Drills; and I do hereby declare that the following is a full, clear, and exact description of the invention, which will enable others skilled in the art to which it appertains to make and use the same, reference being had to the accompanying drawings, which form a part of this specification, and in which—

Figure 1 is a side elevation, and Fig. 2 is a top view.

Similar letters of reference indicate corresponding parts in both the figures.

This invention relates to the drills of corn-planters or seeding-machines; and it consists in the combination, with a supporting-frame consisting of two parallel bars, of a fulcrum-pin, pivoted drill-tooth, and pivoted hangers carrying a circular cutter or colter, &c., substantially as hereinafter more fully described.

In the drawings, A is the seed tube or drill, which has secured upon its upper front side a projecting arm, A', provided with a series of perforations, a a.

The drill is pivoted, by means of its arm A', between two parallel bars, B B, relative to which its angle may be adjusted by inserting a pin, b, through one of the perforations a a.

Pivoted upon the same bolt e upon which arm A' is hung are two curved bars or hangers, C C, of equal size and shape, the other ends of which have each a series of perforations, c c, arranged opposite to each other.

The two parallel bars B B are inserted between the curved bars C C, as shown in Fig. 2, and are perforated to admit of the pin or key d, by means of which the forward ends of C C are adjusted, to be inserted through them.

Between the curved bars C C, at the point or arc of the curve, is hung a circular sharp-edged cutter or colter, denoted by D. By adjusting (raising or lowering) the front ends of bars C C it will be observed that this colter will be adjusted in its relation to the central beams or bars B B and the drill A, while the distance between the point or mouth of the drill and the edge of the rotating colter may also be regulated by adjusting the drill A in its bearings in bars B B, in the manner already described.

Having thus described my improvement, I claim and desire to secure by Letters Patent of the United States—

The combination, as described, of the bars B B, fulcrum-pin or bolt e, adjustable drill-tooth A, provided with the perforated arm A', and adjustable hangers C C, carrying the rotary colter D.

In testimony that I claim the foregoing as my own I have hereto affixed my signature in presence of two witnesses.

WAVERLY ANDERSON.

Witnesses:
   A. F. ROGERS,
   W. H. SALMON.